United States Patent
Lee et al.

(10) Patent No.: US 8,108,661 B2
(45) Date of Patent: Jan. 31, 2012

(54) DATA PROCESSING APPARATUS AND METHOD OF CONTROLLING THE DATA PROCESSING APPARATUS

(75) Inventors: Won Jong Lee, Suwon-si (KR); Chan Min Park, Seongnam-si (KR); Shi Hwa Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 366 days.

(21) Appl. No.: 12/385,265

(22) Filed: Apr. 2, 2009

(65) Prior Publication Data

US 2010/0146242 A1 Jun. 10, 2010

(30) Foreign Application Priority Data

Dec. 5, 2008 (KR) .................. 10-2008-0123061

(51) Int. Cl.
*G06F 9/305* (2006.01)
*G06F 9/50* (2006.01)
*G06F 15/76* (2006.01)

(52) U.S. Cl. ................................. 712/225; 712/16
(58) Field of Classification Search ............. 712/220, 712/16, 225; 710/309
See application file for complete search history.

(56) References Cited

U.S. PATENT DOCUMENTS

| | | | | |
|---|---|---|---|---|
| 4,858,173 A | * | 8/1989 | Stewart et al. | 710/244 |
| 5,179,669 A | * | 1/1993 | Peters | 710/317 |
| 5,325,493 A | * | 6/1994 | Herrell et al. | 712/201 |
| 6,353,847 B1 | | 3/2002 | Maruyama et al. | |
| 6,601,084 B1 | | 7/2003 | Bhaskaran et al. | |
| 6,986,140 B2 | | 1/2006 | Brenner et al. | |
| 7,024,671 B2 | | 4/2006 | Yamashita | |
| 7,038,685 B1 | * | 5/2006 | Lindholm | 345/501 |
| 7,076,594 B2 | * | 7/2006 | Benedetto et al. | 710/316 |
| 2002/0002578 A1 | | 1/2002 | Yamashita | |
| 2003/0225815 A1 | | 12/2003 | Brenner et al. | |
| 2006/0168571 A1 | | 7/2006 | Ghiasi et al. | |
| 2008/0165196 A1 | | 7/2008 | Bakalash et al. | |

FOREIGN PATENT DOCUMENTS

| | | |
|---|---|---|
| JP | 6-274608 | 9/1994 |
| JP | 10-187469 | 7/1998 |
| JP | 2002-278945 | 9/2002 |
| KR | 10-2008-0041047 | 5/2008 |

* cited by examiner

*Primary Examiner* — Daniel Pan
(74) *Attorney, Agent, or Firm* — Staas & Halsey LLP

(57) ABSTRACT

Provided are a data processing apparatus and a method of controlling the data processing apparatus. The data processing apparatus may select a single stream processor from a plurality of stream processors based on stream processor status information, and input data into the selected stream processor. The stream processor status information may include first status information of a processor core and second status information of at least one internal memory.

20 Claims, 6 Drawing Sheets

DATA PROCESSING APPARATUS AND METHOD OF CONTROLLING THE DATA PROCESSING APPARATUS

CROSS-REFERENCE TO RELATED APPLICATIONS

This application claims the priority benefit of Korean Patent Application No. 10-2008-0123061, filed on Dec. 5, 2008, in the Korean Intellectual Property Office, the disclosure of which is incorporated herein by reference.

BACKGROUND

1. Field

One or more exemplary embodiments relate to a data processing apparatus and a method of controlling the data processing apparatus, and more particularly, to a data processing apparatus that may adaptively adjust a load balance at a plurality of stream processors, and a method of controlling the data processing apparatus.

2. Description of the Related Art

A stream processor may be used to process data associated with audios, videos, graphics, and the like. A multiprocessing scheme to process data in parallel using a plurality of streams may be used to reduce a power consumption associated with the data processing and to process the data at a high performance.

When processing data using the plurality of stream processors, a load balancing scheme may be used to enhance a data processing performance. The load balancing scheme may uniformly allocate a load to the plurality of stream processors so that an idle stream processor may not exist.

In particular, when processing multimedia data, a type of data to be processed and a data amount may vary over time. Accordingly, a data processing apparatus including a plurality of stream processors may need to adaptively cope with the type of data and the data amount that varies over time to thereby uniformly allocate a load to the plurality of stream processors.

SUMMARY

According to an aspect of one or more exemplary embodiments, there may be provided an apparatus for processing data, the apparatus including: a plurality of stream processors; a selection unit to generate stream processor status information with respect to each of the stream processors and to select a single stream processor from the plurality of stream processors based on the stream processor status information; and a data management unit to input input data into the selected stream processor. Here, each of the stream processors may include a processor core and at least one internal memory. The stream processor status information may include at least one of first status information of the processor core and second status information of each of the at least one internal memory.

The selection unit may assign a priority to each of the stream processors based on the stream processor status information to select the single stream processor based on the assigned priority.

In this instance, each of the stream processors may include two internal memories. The selection unit may select stream processor status information where first status information of the processor core includes idle status information and second status information of all the two internal memories includes standby status information. The selection unit may also assign a first priority to at least one stream processor corresponding to the selected stream processor status information.

Also, each of the stream processors may include two internal memories. The selection unit may select stream processor status information where first status information of the processor core includes busy status information and second status information of any one of the two internal memories includes standby status information. The selection unit may also assign a second priority to at least one stream processor corresponding to the selected stream processor status information.

Also, each of the stream processors may include two internal memories. The selection unit may select stream processor status information where first status information of the processor core includes idle status information and second status information of any one of the two internal memories includes standby status information. The selection unit may also assign a third priority to at least one stream processor corresponding to the selected stream processor status information.

Also, each of the stream processors may include two internal memories. The selection unit may select stream processor status information where first status information of the processor core includes busy status information and second status information of all the two internal memories includes read/write status information. The selection unit may also assign a fourth priority to at least one stream processor corresponding to the selected stream processor status information.

According to another aspect of one or more exemplary embodiments, there may be provided an apparatus for processing data, the apparatus including: a plurality of stream processors; a selection unit to group the plurality of stream processors into a first stream processor group and a second stream processor group, to select a single first stream processor from the first stream processor group, and to select a single second stream processor from the second stream processor group, a first data management unit to convert first data, extracted from an external memory, to first batch data and to input the first batch data into the first stream processor; and a second data management unit to convert second data, output from the first stream processor, to second batch data and to input the second batch data into the second stream processor. Here, the selection unit may group the plurality of stream processors based on an amount of the first data and an amount of the second data. The selection unit may generate stream processor status information with respect to each of the stream processors to select the first stream processor and the second stream processor based on the stream processor status information.

According to still another aspect of one or more exemplary embodiments, there may be provided a method of controlling a data processing apparatus including a plurality of stream processors, the method including: generating stream processor status information with respect to each of the stream processors; selecting a single stream processor from the plurality of stream processors based on the stream processor status information; and inputting input data into the selected stream processor. Here, each of the stream processors may include a processor core and at least one internal memory. The stream processor status information may include at least one of first status information of the processor core and second status information of each of the at least one internal memory.

Additional aspects of exemplary embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following detailed description, taken in conjunction with the accompanying drawings of which.

DETAILED DESCRIPTION

Figure 1:
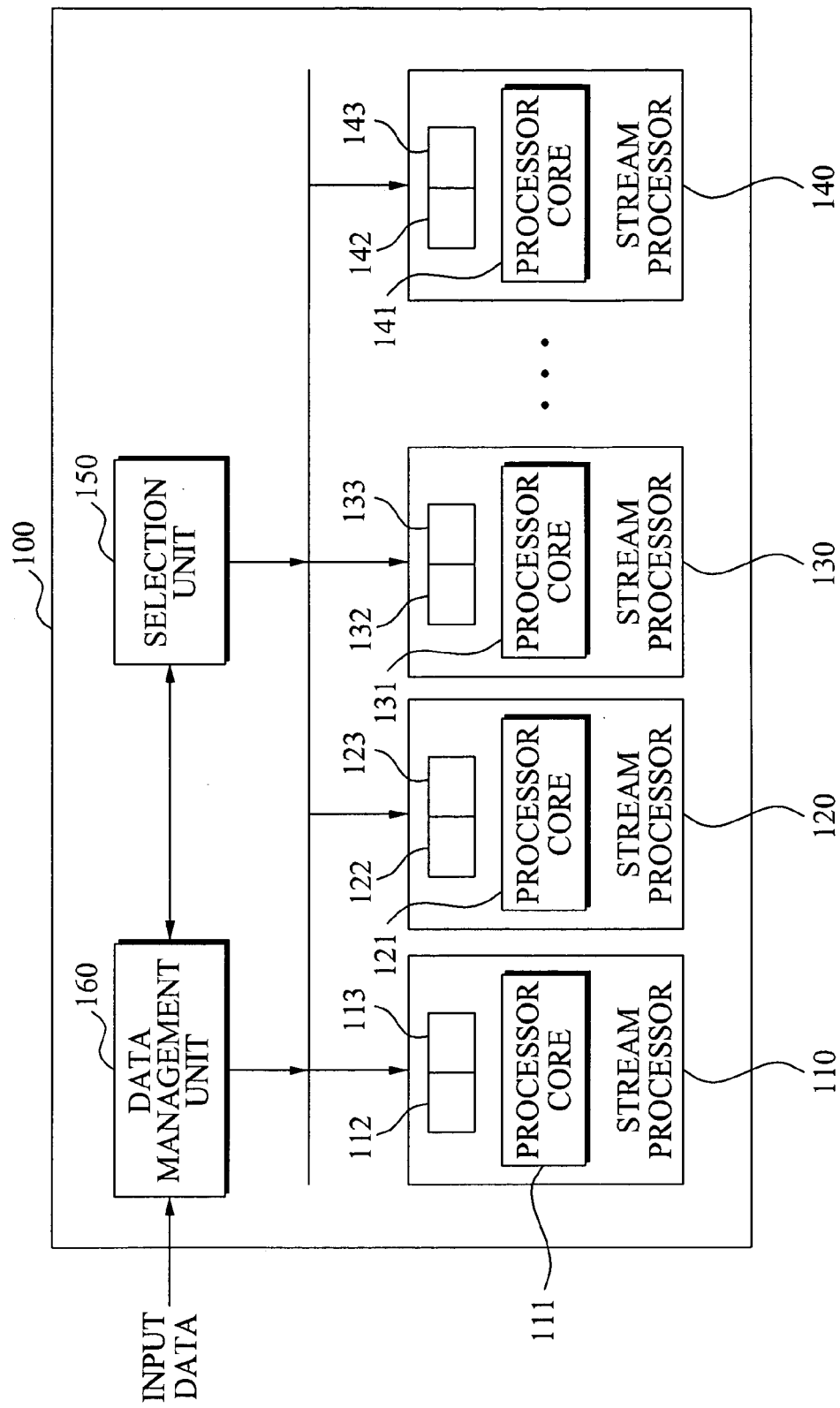
FIG. 1 is a block diagram illustrating a configuration of a data processing apparatus according to an exemplary embodiment.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 is a block diagram illustrating a configuration of a data processing apparatus 100 according to an exemplary embodiment.

The data processing apparatus 100 may include a plurality of stream processors 110, 120, 130, and 140, a selection unit 150, and a data management unit 160. Hereinafter, a configuration of each of constituent elements will be described in detail.

The plurality of stream processors 110, 120, 130, and 140 may process data.

Here, the plurality of stream processors 110, 120, 130, and 140 is connected to each other in parallel and thus may simultaneously process the data.

Each of the stream processors 110, 120, 130, and 140 may include at least one internal memory. Specifically, although the plurality of stream processors 110, 120, 130, and 140 includes two internal memories 112 and 113, 122 and 123, 132 and 133, and 142 and 143, respectively, in FIG. 1, each of the stream processors 110, 120, 130, and 140 may include a single internal memory or may include at least three internal memories depending on exemplary embodiments.

As shown in FIG. 1, the plurality of stream processors 110, 120, 130, and 140 may have the same structure. Accordingly, hereinafter, descriptions related to a structure of each of the stream processors 110, 120, 130, and 140, operations and statuses of processor core 111, 121, 131, and 141 and the internal memories 112 and 113, 122 and 123, 132 and 133, and 142 and 143, included in the stream processors 110, 120, 130, and 140, respectively, will be described based on the stream processor 110.

The processor core 111 may process data. The two internal memories 112 and 113 may store data received from the data management unit 160. Since the stream processor 110 includes the two internal memories 112 and 113, the stream processor 110 may process the data using a double buffering.

The selection unit 150 may generate stream processor status information with respect to each of the stream processors 110, 120, 130, and 140, and may select a single stream processor from the plurality of stream processors 110, 120, 130, and 140, based on the stream processor status information.

The data management unit 160 may input input data into the selected stream processor. According to an exemplary embodiment, the data management unit 160 may convert the input data to batch data and input the converted batch data into the selected stream processor.

When processing the data using the plurality of stream processors 110, 120, 130, and 140, there may be a need to uniformly allocate a load to the plurality of stream processors 110, 120, 130, and 140 so that an idle stream processor may not exist, and to thereby adjust a load balancing. In order to select the idle stream processor from the plurality of stream processors 110, 120, 130, and 140, the selection unit 150 may generate the stream processor status information and select the single stream processor based on the generated stream processor status information.

According to an exemplary embodiment, the selection unit 150 may select a single stream processor based on stream processor status information at a point in time when the data management unit 160 receives data (hereinafter, a first point in time).

When the selection unit 150 selects a stream processor to receive the data at a point in time when the data management unit 160 desires to input the data into the stream processor (hereinafter, a second point in time), the data management unit 160 may need to include an internal output memory in order to temporarily store the data to be input into the stream processor due to a time used for the selection unit 150 to determine whether the stream processor is idle.

However, when the selection unit 150 does not select the single stream processor at the second point in time and selects the single stream processor at the first point in time, the data management unit 160 may input the data into the selected stream processor without storing the data. Accordingly, the data management unit 160 may not need the output internal memory.

For example, when the data management unit 160 converts input data to batch data and then inputs the converted batch data into a stream processor and the selection unit 150 selects a single stream processor at the second point in time, the data management unit 160 may need to store the converted batch data for a predetermined period of time that is used for the selection unit 150 to select the single stream processor. Accordingly, the data management unit 160 may need the output internal memory. However, when the selection unit 150 predicts a stream processor status corresponding to the second point in time in advance at the first point in time and selects the single stream processor according to a predicted result, the data management unit 160 may immediately input the converted batch data into the selected stream processor without storing the converted batch data.

When the selection unit 150 selects the single stream processor in advance based on the predicted stream processor status, the data management unit 160 may not need the output internal memory. Accordingly, unnecessary costs may be reduced. Also, the data management unit 160 may immediately input the batch data into the selected stream processor without storing the batch data in the output internal memory. Accordingly, a data processing speed may be enhanced.

According to an exemplary embodiment, the data processing apparatus 100 may be used to process data in association with generating a three-dimensional (3D) image.

In this case, the input data may correspond to vertex data and a stream processor to receive the vertex data may perform vertex processing.

Specifically, the data management unit 160 may extract the vertex data from an external memory (not shown) to input the extracted vertex data into a single stream processor among the plurality of stream processors 110, 120, 130, and 140. In this case, a vertex shader kernel may be mapped at the stream processor. The stream processor may function as a vertex shader.

The data management unit 160 may convert the extracted vertex data to vertex batch data to input the converted vertex batch data into the stream processor.

According to an exemplary embodiment, the input data may correspond to fragment data and a stream processor to receive the fragment data may perform pixel processing.

Specifically, the data management unit 160 may receive vertex data that is processed at the vertex shader and may input the received vertex data into a single stream processor. In this case, the pixel shader kernel may be mapped at the stream processor. The stream processor may function as a pixel shader.

The data management unit 160 may convert the processed vertex data to batch data, convert the batch data to fragment batch data, and input the converted fragment batch data into the single stream processor.

Hereinafter, stream processor status information required to select a single stream processor will be described in detail.

The stream processor status information may include first status information corresponding to status information of the processor core 111 and second status information corresponding to status information of the internal memories 112 and 113. Although it is described herein that the stream processor status information includes the first status information and the second status information, exemplary embodiments are not limited thereto. It will be apparent to those skilled in the art that the stream processor status information may include any one of the first status information and the second status information.

According to an exemplary embodiment, the first status information may include any one of busy status information and idle status information.

For example, when it is determined the processor core 111 performs a data processing operation, that is, when it is determined the processor core 111 is in a busy status, the first status information of the processor core 111 may include the busy status information. Conversely, when it is determined the processor core 111 does not perform the data processing operation, that is, when it is determined the processor core 111 is in an idle status, the first status information of the processor core 111 may include the idle status information. For example, the first status information may be expressed by a single bit. In this case, the busy status information may be expressed by "1" and the idle status information may be expressed by "0".

According to an exemplary embodiment, the second status information may include any one of read/write status information and standby status information.

For example, when data is stored in the internal memory 112 or when the data is extracted from the internal memory 112, the second status information of the internal memory 112 may include the read/write status information. Conversely, when the internal memory 112 is in a standby status, the second status information of the internal memory 112 may include the standby status information. For example, the second status information may also be expressed by a single bit. In this case, the read/write status information may be expressed by "1" and the standby status information may be expressed by "0".

The selection unit 150 may select a single stream processor from the plurality of stream processors 110, 120, 130, and 140 based on the stream processor status information that includes the first status information and the second status information.

According to an exemplary embodiment, the selection unit 150 may assign a priority to each of the stream processors 110, 120, 130, and 140 based on the stream processor status information and may select the single stream processor based on the assigned priority.

In this instance, according to an exemplary embodiment, the selection unit 150 may select stream processor status information where first status information of a processor core includes idle status information and second status information of all the two internal memories includes standby status information. The selection unit 150 may also assign a first priority to at least one stream processor corresponding to the selected stream processor status information.

Also, according to an exemplary embodiment, the selection unit 150 may select stream processor status information where first status information of a processor core includes busy status information and second status information of any one of two internal memories includes standby status information. The selection unit 150 may also assign a second priority to at least one stream processor corresponding to the selected stream processor status information.

Also, according to an exemplary embodiment, the selection unit 150 may select stream processor status information where first status information of a processor core includes idle status information and second status information of any one of two internal memories includes standby status information. The selection unit 150 may also assign a third priority to at least one stream processor corresponding to the selected stream processor status information.

Also, according to an exemplary embodiment, the selection unit 150 may select stream processor status information where first status information of a processor core includes busy status information and second status information of all the two internal memories includes read/write status information. The selection unit 150 may also assign a fourth priority to at least one stream processor corresponding to the selected stream processor status information.

Hereinafter, an operation of assigning, by the selection unit 150, a priority to each of stream processors based on first status information and second status information will be described in detail with reference to the following Table 1.

TABLE 1

| First status Information | Second status information | Priority |
|---|---|---|
| 0 | 0 | 0 | 1 |
| 0 | 0 | 1 | 3 |
| 0 | 1 | 0 | |
| 0 | 1 | 1 | No priority |
| 1 | 0 | 0 | |
| 1 | 0 | 1 | 2 |
| 1 | 1 | 0 | |
| 1 | 1 | 1 | 4 |

The above Table 1 includes combinations of probable stream processor status information when the stream processor includes a processor core and two internal memories.

Here, it is assumed that each of the first status information and the second status information is expressed by a single bit.

Accordingly, it is assumed that, when the first status information has a value of "1", the processor core is in a busy status, and when the first status information has a value of "0", the processor core is in an idle status.

Similarly, it is assumed that, when the second status information has a value of "1", the internal memories are in a read/write status, and when the second status information has a value of "0", the internal memories are in a standby status.

Also, the stream processor information shown in the above Table 1 may be expressed by [first status information of the processor core, second status information of a first internal memory, second status information of a second internal memory]. For example, when the first status information of the processor core has a value of "1", the second status information of the first internal memory has a value of "0", and the second status information of the second internal memory has a value of "1", the stream processor status information may be expressed by [1, 0, 1].

As described above, the stream processor status information of the above Table 1 indicates information associated with the stream processor status at the first point in time.

In a first case where stream processor status information is [0, 0, 0], the processor core is in the idle status and all the two internal memories are in the standby status. Accordingly, it may be highly probable that a stream processor corresponding to the above stream processor status information may not perform a data processing operation around a second point in time. Accordingly, the selection unit 150 may assign the first priority to a stream processor that includes the stream processor status information of [0, 0, 0].

In a second case where stream processor status information is [1, 1, 0] or [1, 0, 1], the processor core is in the busy status and any one of the two internal memories is in the read/write status. In this case, since the processor is in the busy status, data may be extracted from any one of the two internal memories. Accordingly, the other internal memory is in the read status.

In this instance, since the processor core extracts data from any one of the two internal memories to process the extracted data and data does not exist in the other internal memory, it may be highly probable that a stream processor having the above stream processor status information of [1, 1, 0] or [1, 0, 1] may not perform the data processing operation around the second point in time. However, in the second case, in comparison to the first case, a probability that the stream processor may not perform the data processing operation may be low. Accordingly, the selection unit 150 may assign the second priority to the stream processor that includes the stream processor status information of [1, 1, 0] or [1, 0, 1].

In a third case where stream processor status information is [0, 1, 0] or [0, 0, 1], the processor core is in the idle status and any one of the two internal memories is in the read/write status. In this case, since the processor core is in the idle status, data may be stored in any one of the two internal memories. Accordingly, the other internal memory is in the write status.

In this instance, since the processor core does not process the data and the data is stored in any one of the two internal memories, it may be highly probable that a stream processor having the above stream processor status information of [0, 1, 0] or [0, 0, 1] may perform a data processing operation around the second point in time. However, unlike the following fourth case to be described later, since the data does not exist in the other internal memory among the two internal memories, there is a sufficient space to receive another data from the data management unit 160. Accordingly, the selection unit 150 may assign the third priority to the stream processor that includes the stream processor status information of [0, 1, 0] or [0, 0, 1].

In a fourth case where stream processor status information is [1, 1, 1], the processor core is in the busy status and all the two internal memories are in the read/write status. In this case, since the processor core is in the busy status, data may be stored in any one of the two internal memories and the data may be extracted from the other internal memory. Accordingly, among the two internal memories, any one internal memory is in the write status and the other internal memory is in the read status.

In this instance, since the processor core processes the data and the data is extracted from any one of the two internal memories, a probability that a stream processor having the above stream processor status information [1, 1, 1] may perform the data processing operation around the second point in time may be similar to the aforementioned third case. However, unlike the third case, since the data is stored in or extracted from all the two internal memories, there may not exist any sufficient space to receive another data from the data management unit 160. Accordingly, the selection unit 150 may assign the fourth priority to the stream processor that includes the stream processor status information of [1, 1, 1].

In a fifth case where the stream processor status information is [1, 0, 0], the processor core is in the busy status and all the two internal memories are in the standby status. However, the fifth case does not exist. Similarly, when the stream processor status information is [0, 1, 1], the processor core is in the idle status and all the two internal memories are in the read/write status. However, this case does not exist.

When the selection unit 150 assigns the priority to each of the plurality of stream processors, the selection unit 150 may select a stream processor according to a higher priority and the data management unit 160 may input the data into the selected stream processor.

When the plurality of stream processors has the same priority, the selection unit 150 may arbitrarily select a single stream processor from the plurality of stream processors having the same priority.

Accordingly, the selection unit 150 may enhance an accuracy in predicting a stream processor status around the second point in time.

Hereinafter, a configuration of the selection unit 150 will be further described in detail with reference to FIG. 2.

Figure 2:
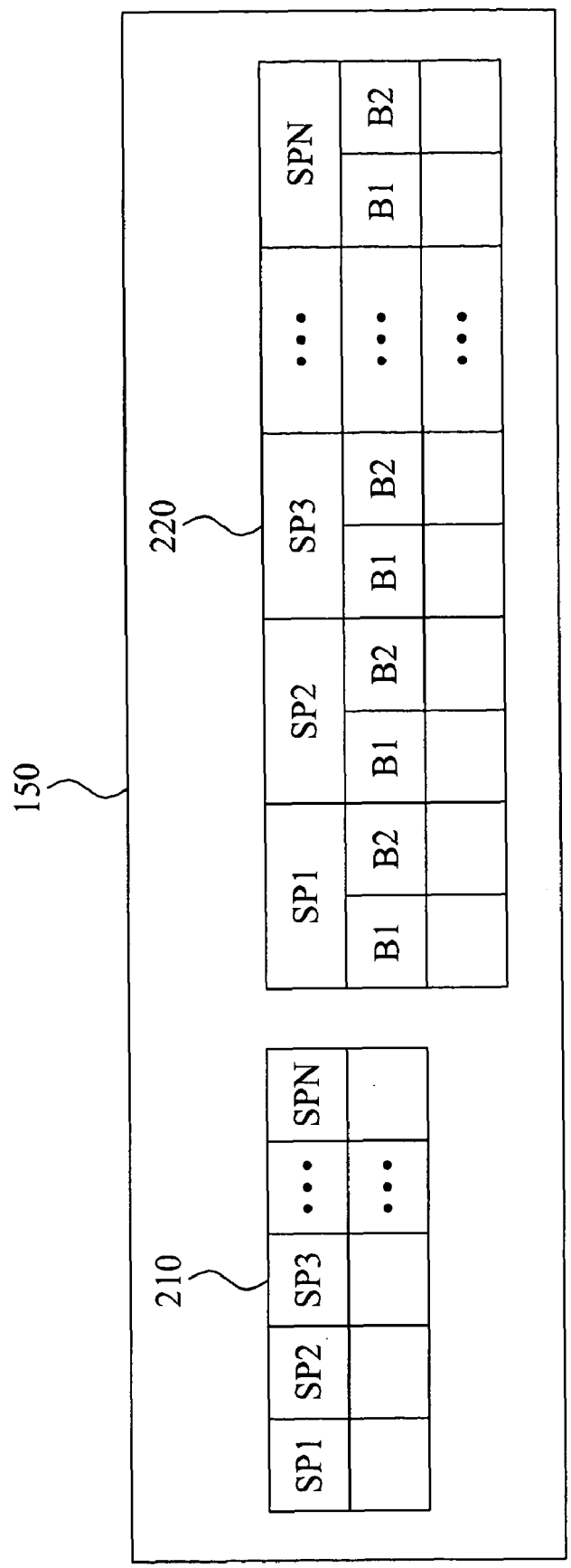
FIG. 2 is a block diagram illustrating a configuration of a selection unit of FIG. 1.

FIG. 2 is a block diagram illustrating a configuration of the selection unit 150 of FIG. 1.

Here, it is assumed that each single stream processor SP includes two internal memories B1 and B2.

The selection unit 150 may include a first register 210 and a second register 220.

First status information may be stored in the first register 210. Second status information may be stored in the second register 220.

As described above, the first status information and the second status information may be expressed by a single bit. Accordingly, the first register 210 and the second register 220 may store "0" or "1".

According to an exemplary embodiment, the selection unit 150 may further include a first ready queue (not shown) corresponding to the data management unit 160 and a plurality of second ready queues (not shown) corresponding to the plurality of stream processors 110, 120, 130, and 140, respectively.

The first ready queue may store index information of a stream processor to receive data that is output from the data management unit 160. Since the data is sequentially output from the data management unit 160, the first ready queue may store index information of each of the stream processors 110, 120, 130, and 140 according to an output order.

Each of the second ready queues may store information regarding in which internal memory, among at least one internal memory of a stream processor, to store data input from the data management unit 160.

Figure 3:
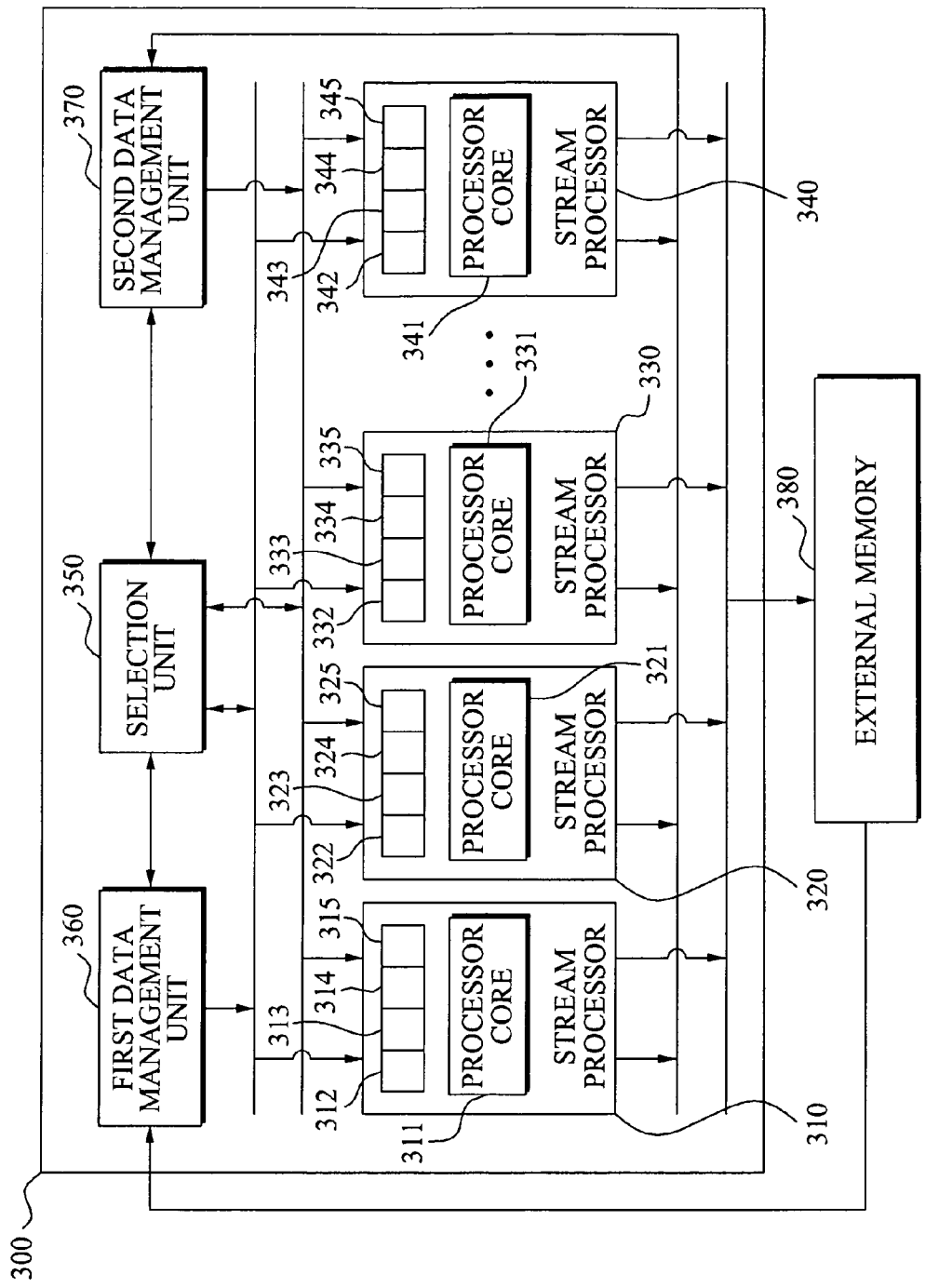
FIG. 3 is a block diagram illustrating a configuration of a data processing apparatus according to another exemplary embodiment.

FIG. 3 is a block diagram illustrating a configuration of a data processing apparatus 300 according to another exemplary embodiment.

The data processing apparatus 300 may include a plurality of stream processors 310, 320, 330, and 340, a selection unit 350, a first data management unit 360, and a second data management unit 370. The plurality of stream processors 310, 320, and 330, and 340 may include single processor cores 311, 321, 331, and 341, and four internal memories 312, 313, 314, and 315, 322, 323, 324, and 325, 332, 333, 334, and 335, and 342, 343, 344, and 345, respectively. Hereinafter, a configuration of each of constituent elements will be described in detail.

The plurality of stream processors 310, 320, 330, and 340 may process data.

Here, the plurality of stream processors 310, 320, 330, and 340 is connected to each other in parallel and thus may simultaneously process the data.

Each of the stream processors 310, 320, 330, and 340 may include at least one internal memory. Specifically, although the plurality of stream processors 310, 320, 330, and 340 includes four internal memories 312, 313, 314, and 315, 322, 323, 324, and 325, 332, 333, 334, and 335, and 342, 343, 344, and 345 in FIG. 3, a number of internal memories to be included in each of the stream processors 310, 320, 330, and 340 may be different depending on exemplary embodiments.

The selection unit 350 may group the plurality of stream processors 310, 320, 330, and 340 into a first stream processor group and a second stream processor group. The selection unit 350 may select a single first stream processor from the first stream processor group, and select a single second stream processor from the second stream processor group.

The first stream processor and the second stream processor may perform a different data processing operation. For example, the first stream processor may perform vertex processing whereas the second processor may perform pixel processing.

Hereinafter, it will be described that the first stream processor performs vertex processing and the second processor performs pixel processing, but exemplary embodiments are not limited thereto. Specifically, it will be apparent to those skilled in the art that the first stream processor and the second stream processor may perform different processing in addition to vertex processing and pixel processing.

When performing both vertex processing and pixel processing via the plurality of stream processors 310, 320, 330, and 340, a portion thereof may be used as a vertex shader and another portion thereof may be used a pixel shader.

Here, it is assumed that two internal memories 312 and 313 among four internal memories 312, 313, 314, and 315 of the stream processor 310 may be used when the stream processor 310 functions as the vertex shader, and the remaining two internal memories 314 and 315 may be used when the stream processor 310 functions as the pixel shader.

When performing vertex processing and pixel processing using the plurality of stream processors 310, 320, 330, and 340, it may be possible to appropriately adjust a number of first stream processors that may be used as the vertex shader and a number of second stream processors that may be used as the pixel shader. In this case, it is possible to prevent a bottleneck phenomenon, which may occur in the vertex processing and the pixel processing, and thereby process the data at a high speed.

Accordingly, the selection unit 350 may group the plurality of stream processors 310, 320, 330, and 340 into the first stream processor group to be used as the vertex shader and into the second stream processor group to be used as the pixel shader.

In this instance, the selection unit 350 may compare a first data amount of data to perform vertex processing (hereinafter, first data) and a second data amount of data to perform pixel processing (hereinafter, second data), and determine the number of first stream processors included in the first stream processor group and the number of second stream processors included in the second stream processor group. Through this, the selection unit 350 may group the plurality of stream processors 310, 320, 330, and 340.

For example, when the first data amount is greater than the second data amount, the selection unit 350 may group the plurality of stream processors 310, 320, 330, and 340 by increasing a ratio of the number of first stream processors among the plurality of stream processors 310, 320, 330, and 340. Conversely, when the first data amount is less than the second data amount, the selection unit 350 may group the plurality of stream processors 310, 320, 330, and 340 by increasing a ratio of the number of second stream processors among the plurality of stream processors 310, 320, 330, and 340. Hereinafter, it is assumed that the selection unit 350 groups the stream processors 310 and 320 into the first stream processor group, and groups the stream processors 330 and 340 into the second stream processor group.

When the plurality of stream processors 310, 320, 330, and 340 are grouped into the first stream processor group and the second stream processor group, the selection unit 350 may select a single first stream processor from the first stream processor group. Here, it is assumed that the stream processor 310 is selected as the first stream processor.

In this case, the selection unit 350 may select the single first stream processor 310 using first status information of the processor core 311 and second status information of the two internal memories 312 and 313.

The first data management unit 360 may convert first data, extracted from an external memory 380, to first batch data and input the converted first batch data into the first stream processor 310. In this instance, the first data may correspond to vertex data. The first data management unit 360 may correspond to a batch management unit.

The first stream processor 310 may process the first batch data to output second data. The output second data may be input into the second data management unit 370.

The selection unit 350 may select a single second stream processor from the second stream processor group. Here, it is assumed that the stream processor 330 is selected as the second stream processor.

In this case, the selection unit 350 may select the single second stream processor 330 using first status information of the processor core 331 and second status information of the two internal memories 334 and 335. An operation of selecting, at the selection unit 350, the first stream processor 310 and the second stream processor 330 may correspond to an operation of selecting, at the selection unit 150 of FIG. 1, a single stream processor and thus further detailed descriptions related thereto will be omitted.

The second data management unit 370 may convert the input second data to second batch data and input the second batch data into the second stream processor 330. In this case, the second batch data may correspond to fragment data. The second data management unit 370 may correspond to a fragment generator.

The fragment data that is processed at the second stream processor 330 to receive the output second data may be input into a raster operator (not shown). The raster operator may perform a depth test, a stencil test, an alpha test, and the like, and perform blending with respect to the processed fragment data to thereby generate a 3D image.

The data processing apparatus 300 according to an exemplary embodiment may solve a bottleneck phenomenon that may occur in vertex processing and pixel processing and thereby process data at a high speed.

Also, the data processing apparatus 300 according to another exemplary embodiment may predict and select a single first stream processor and a single second stream processor based on a predicted stream processor status, and may input data into the selected first stream processor and the second stream processor without causing a delay. Through this, it is possible to enhance a data processing speed.

Hereinafter, a configuration of the selection unit 350 will be further described in detail with reference to FIG. 4.

Figure 4:
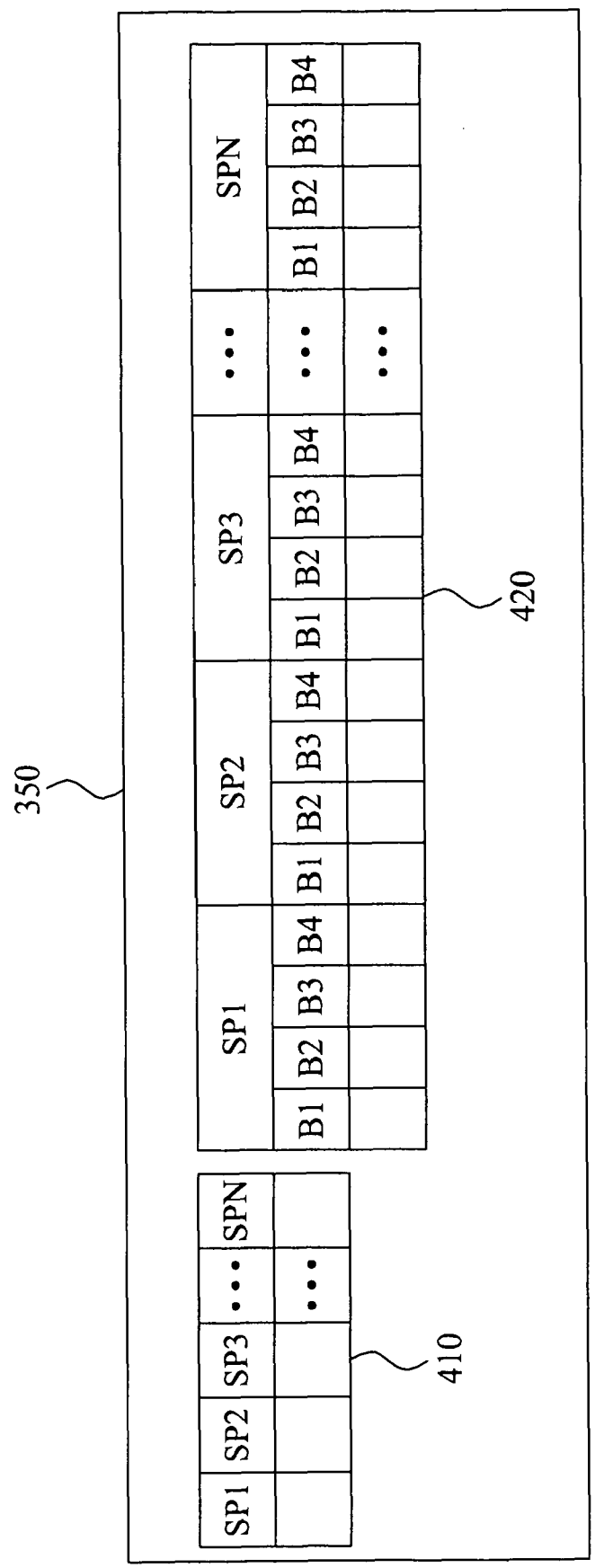
FIG. 4 is a block diagram illustrating a configuration of a selection unit of FIG. 3.

FIG. 4 is a block diagram illustrating a configuration of the selection unit 350 of FIG. 3.

Here, it is assumed that each single stream processor SP includes four internal memories B1, B2, B3, and B4. Among the four internal memories B1, B2, B3, and B4, two internal memories B1 and B2 are used when a corresponding stream processor performs vertex processing and the remaining two internal memories B3 and B4 are used when the stream processor performs pixel processing.

The selection unit 350 may include a first register 410 and a second register 420.

First status information may be stored in the first register 410. Second status information may be stored in the second register 420.

As described above, the first status information and the second status information may be expressed by a single bit. Accordingly, the first register 410 and the second register 420 may store "0" or "1".

According to an exemplary embodiment, the selection unit 350 may include a single first ready queue (not shown) corresponding to the first data management unit 360, a plurality of second ready queues (not shown) corresponding to the plurality of stream processors 310, 320, 330, and 340, respectively, and a single third ready queue (not shown) corresponding to the second data management unit 370.

The first ready queue may store index information of a first stream processor to receive data that is output from the first data management unit 360. Since the data is sequentially output from the first data management unit 360, the first ready queue may store index information of each of the stream processors 310, 320, 330, and 340 according to an output order.

The third ready queue may store index information of a second stream processor to receive data that is output from the second data management unit 370. Since the data is sequentially output from the second data management unit 370, the third ready queue may store index information of each of the stream processors 310, 320, 330, and 340 according to an output order.

Each of the second ready queues may match and store information in regarding which internal memory, among at least one internal memory of a stream processor, to store data input from the first data management unit 360 and the second data management unit 370, and information regarding whether the input data is the first batch data or the second batch data.

Figure 5:
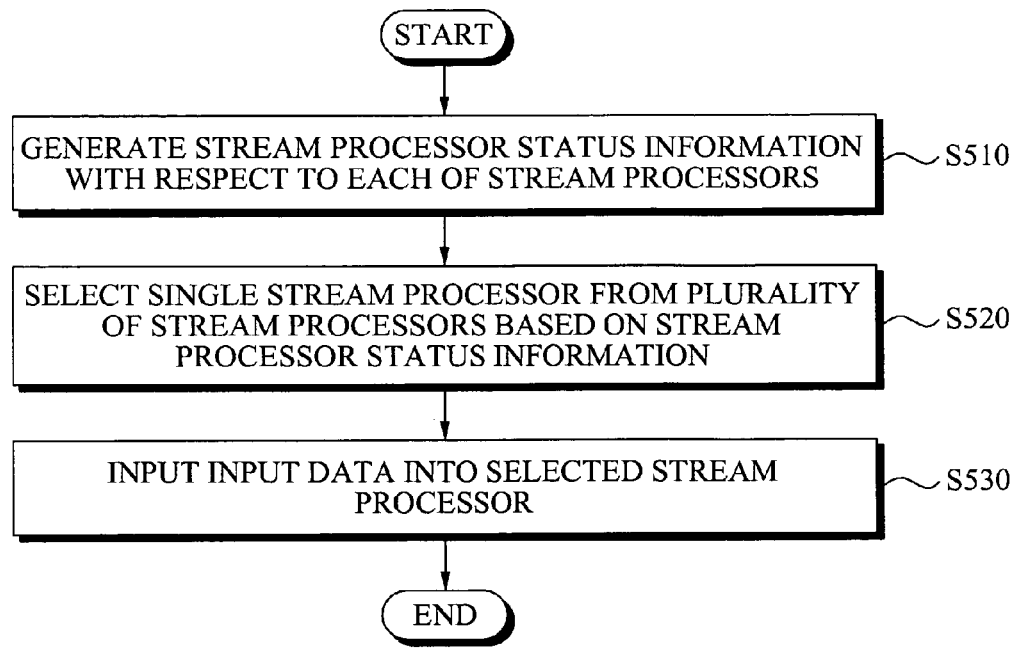
FIG. 5 is a flowchart illustrating a method of controlling a data processing apparatus according to an exemplary embodiment.

FIG. 5 is a flowchart illustrating a method of controlling a data processing apparatus according to an exemplary embodiment.

In operation S510, the data processing apparatus may generate stream processor status information with respect to each of stream processors.

Since each of the stream processors includes a processor core and at least one internal memory, the generated stream processor status information may include first status information corresponding to status information of the processor core and second status information corresponding to status information of the at least one internal memory.

In operation S520, the data processing apparatus may select a single stream processor from the plurality of stream processors based on the stream processor status information.

Operations S510 and S520 may be to select an idle stream processor from the plurality of stream processors. Accordingly, in the data processing method using the plurality of stream processors, operations S510 and S520 may be performed to adjust a load balance at the stream processors.

According to an exemplary embodiment, the first status information may include any one of busy status information and idle status information.

Specifically, when the processor core is in a busy status, the first status information may include the busy status information. When the processor core is in an idle status, the first status information may include the idle status information.

According to an exemplary embodiment, the second status information may include any one of read/write status information and standby status information.

When the internal memory is in a read/write status, the second status information may include the read/write status information. When the internal memory is in a standby status, the second status information may include the standby status information.

According to an exemplary embodiment, operation S520 may include an operation of assigning a priority to each of the stream processors based on the stream processor status information. In this case, the data processing apparatus may select the single stream processor from the plurality of stream processors based on the assigned priority in operation S520.

Hereinafter, an operation of assigning the priority to each of the stream processors in operation S520 when each of the stream processors includes two internal memories will be described in detail.

According to an exemplary embodiment, in operation S520, the data processing apparatus may select stream processor status information where first status information of a processor includes idle status information and second status information of all the two internal memories includes standby status information. The data processing apparatus may also assign a first priority to at least one stream processor corresponding to the selected stream processor status information.

Also, according to an exemplary embodiment, in operation S520, the data processing apparatus may select stream processor status information where first status information of a processor core includes busy status information and second status information of any one of two internal memories includes standby status information. The data processing apparatus may assign a second priority to at least one stream processor corresponding to the selected stream processor status information.

Also, according to an exemplary embodiment, in operation S520, the data processing apparatus may select stream processor status information where first status information of a processor core includes idle status information and second status information of any one of the two internal memories includes standby status information. The data processing apparatus may also assign a third priority to at least one stream processor corresponding to the selected stream processor status information.

Also, according to an exemplary embodiment, in operation S520, the data processing apparatus may select stream processor status information where first status information includes busy status information and second status information of all the two internal memories includes read/write status information. The data processing apparatus may also assign a fourth priority to at least one stream processor corresponding to the selected stream processor status information.

Further detailed descriptions related to assigning of the priority will be referred to the above Table 1.

In operation S530, the data processing apparatus may input the input data into the selected single stream processor. A stream processor to receive the input data may process the input data.

According to an exemplary embodiment, in operation S530, the data processing apparatus may convert the input data to batch data and input the converted batch data into the selected stream processor.

Operation S520 may be performed prior to operation S530. Specifically, according to an exemplary embodiment, it is possible to predict a status of each of stream processors and to select a single stream processor to process data based on a prediction result.

In this instance, the input data may be immediately input into the selected stream processor, without being stored in an output internal memory in operation S530. Through this, it is possible to enhance a data processing speed.

According to an exemplary embodiment, the controlling method of the data processing apparatus may be used to process data in association with generating a 3D image.

In this case, input data may correspond to vertex data and a stream processor to receive the vertex data may perform vertex processing.

Also, according to another exemplary embodiment, the input data may correspond to fragment data and a stream processor to receive the fragment data may perform pixel processing.

Figure 6:
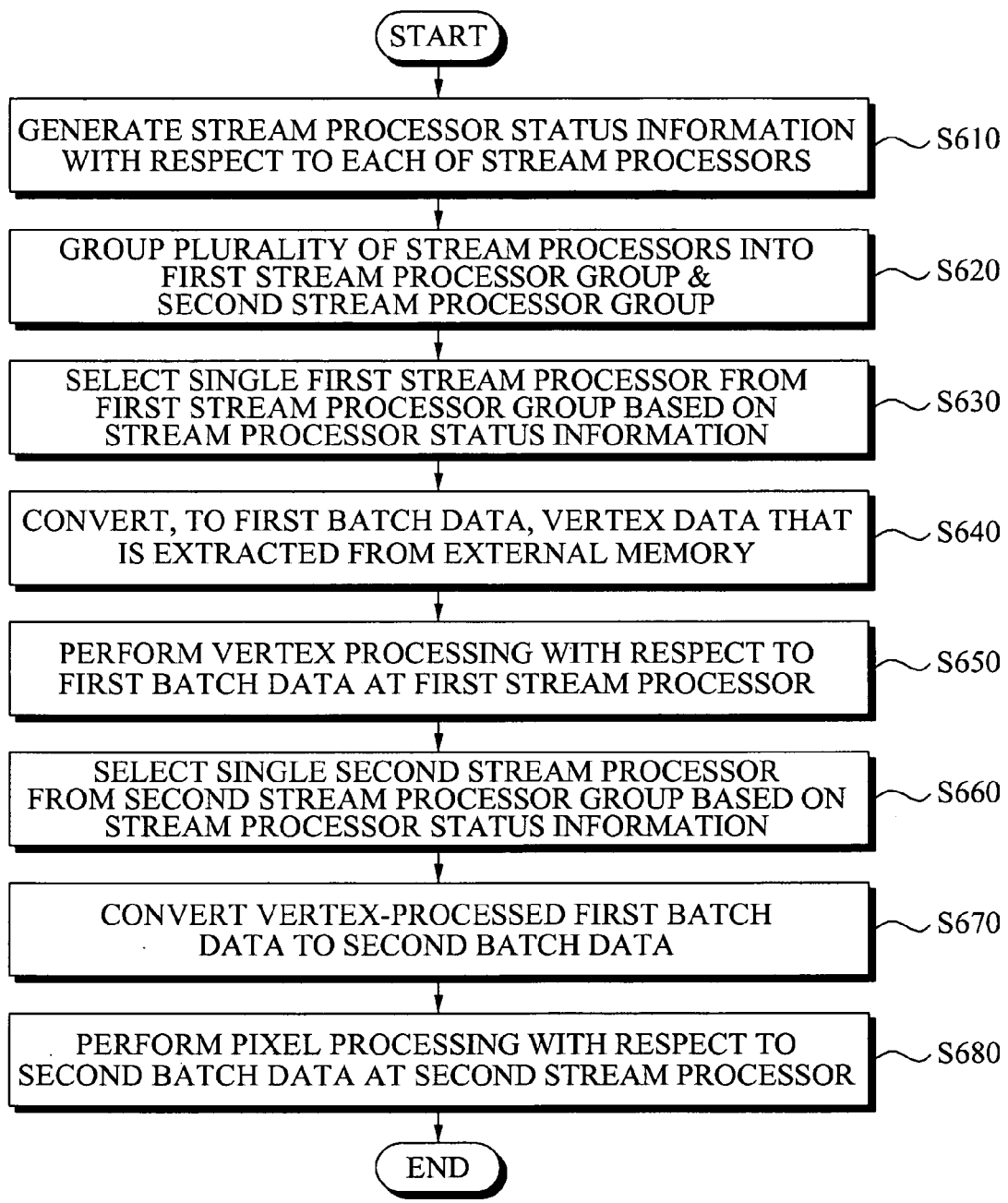
FIG. 6 is a flowchart illustrating a method of controlling a data processing apparatus according to another exemplary embodiment.

FIG. 6 is a flowchart illustrating a method of controlling a data processing apparatus according to another exemplary embodiment.

Here, it is assumed that the controlling method of the data processing apparatus is applied for a stream processor that includes a processor core and four internal memories. Also, it is assumed that a first stream processor performs vertex processing and a second stream processor performs pixel processing. However, exemplary embodiments are not limited thereto, which will be apparent to those skilled in the art.

In operation S610, the data processing apparatus may generate stream processor status information with respect to each of stream processors. The stream processor status information may include first status information of the processor core and second status information of the internal memories.

In operation S620, the data processing apparatus may group the plurality of stream processors into a first stream processor group and a second stream processor group.

In this instance, in operation S620, the data processing apparatus may compare a data amount of first data to perform vertex processing and a data amount of second data to perform pixel processing to thereby group the plurality of stream processors.

In operation S630, the data processing apparatus may select a single first stream processor from the first stream processor group based on the stream processor status information. Operation S630 may correspond to operation S520 of FIG. 5.

In operation S640, the data processing apparatus may convert, to first batch data, vertex data that is extracted from an external memory.

In operation S650, the data processing apparatus may perform vertex processing with respect to the first batch data at the first stream processor.

In operation S660, the data processing apparatus may select a single second stream processor from the second stream processor group based on the stream processor status information. Operation S660 may also correspond to operation S520 of FIG. 5.

In operation S670, the data processing apparatus may convert vertex-processed first batch data to second batch data. The second batch data may correspond to fragment data.

In operation S680, the data processing apparatus may perform pixel processing with respect to the second batch data at the second stream processor.

Since the plurality of stream processors processes data in parallel, operations S630 through S680 may be simultaneously performed at the plurality of stream processors.

The configuration of the data processing apparatus described above with reference to FIGS. 1 through 4 may be applicable to exemplary embodiments of the controlling method of the data processing apparatus. Accordingly, further detailed descriptions related thereto will be omitted here.

The data processing apparatus controlling method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, it would be appreciated by those skilled in the art that changes may be made in these exemplary embodiments without departing from the principles and spirit of the disclosure, the scope of which is defined by the claims and their equivalents.

What is claimed is:

1. An apparatus for processing data, the apparatus comprising:
   a plurality of stream processors;
   a selection unit to generate stream processor status information with respect to each of the stream processors and to select a single stream processor from the plurality of stream processors based on the stream processor status information; and
   a data management unit to input input data into the selected stream processor,
   wherein each of the stream processors includes a processor core and at least one internal memory, and the stream processor status information comprises at least one of first status information of the processor core and second status information of each of the at least one internal memory, and
   wherein the selection unit assigns a priority to each of the stream processors by comparing the second status information of each of the plurality of stream processors, and then comparing the first status information of each of the plurality of stream processors, and the selection unit selects the single stream processor based on the assigned priority.

2. The apparatus of claim 1, wherein the first status information comprises any one of busy status information and idle status information.

3. The apparatus of claim 1, wherein the second status information comprises any one of read/write status information and standby status information.

4. The apparatus of claim 1, wherein the selection unit assigns a priority to a steam processor of which the second status information corresponds to standby status information that is higher than a priority of a stream processor of which the second status information corresponds to read/write status information, assigns a priority to a stream processor of which the first status information corresponds to idle status information that is higher than a priority of a stream processor of which the first status information corresponds to busy status information, and selects the single stream processor based on the assigned priority.

5. The apparatus of claim 4, wherein:
   each of the stream processors includes two internal memories, and
   the selection unit selects stream processor status information where first status information of the processor core includes idle status information and second status information of all the two internal memories includes standby status information, and the selection unit assigns a first priority to at least one stream processor corresponding to the selected stream processor status information.

6. The apparatus of claim 4, wherein:
   each of the stream processors includes two internal memories, and
   the selection unit selects stream processor status information where first status information of the processor core includes busy status information and second status information of any one of the two internal memories includes standby status information, and the selection unit assigns a second priority to at least one stream processor corresponding to the selected stream processor status information.

7. The apparatus of claim 4, wherein:
   each of the stream processors includes two internal memories, and
   the selection unit selects stream processor status information where first status information of the processor core includes idle status information and second status information of any one of the two internal memories includes standby status information, and the selection unit assigns a third priority to at least one stream processor corresponding to the selected stream processor status information.

8. The apparatus of claim 4, wherein:
   each of the stream processors includes two internal memories, and
   the selection unit selects stream processor status information where first status information of the processor core includes busy status information and second status information of all the two internal memories includes read/write status information, and the selection unit assigns a fourth priority to at least one stream processor corresponding to the selected stream processor status information.

9. The apparatus of claim 1, wherein:
   the input data corresponds to vertex data, and
   the selected stream processor receives the vertex data and performs vertex processing.

10. The apparatus of claim 1, wherein:
    the input data corresponds to fragment data, and
    the selected stream processor receives the fragment data and performs pixel processing.

11. An apparatus for processing data, the apparatus comprising:
    a plurality of stream processors;
    a selection unit to group the plurality of stream processors into a first stream processor group and a second stream processor group, to select a single first stream processor from the first stream processor group, and to select a single second stream processor from the second stream processor group,
    a first data management unit to convert first data, extracted from an external memory, to first batch data and to input the first batch data into the first stream processor; and
    a second data management unit to convert second data, output from the first stream processor, to second batch data and to input the second batch data into the second stream processor,
    wherein the selection unit groups the plurality of stream processors based on an amount of the first data and an amount of the second data, and
    the selection unit generates stream processor status information with respect to each of the stream processors to select the first stream processor and the second stream processor based on the stream processor status information.

12. The apparatus of claim 11, wherein:
    each of the stream processors includes a processor core and at least one internal memory, and
    the stream processor status information comprises at least one of first status information of the processor core and second status information of each of the at least one internal memory.

13. The apparatus of claim 11, wherein:
    the first data corresponds to vertex data, and
    the selected first stream processor performs vertex processing.

14. The apparatus of claim 11, wherein:
    the second batch data corresponds to fragment data, and
    the selected second stream processor performs pixel processing.

15. A method of controlling a data processing apparatus comprising a plurality of stream processors, the method comprising:

generating stream processor status information with respect to each of the stream processors;

selecting a single stream processor from the plurality of stream processors based on the stream processor status information; and inputting input data into the selected stream processor, wherein each of the stream processors includes a processor core and at least one internal memory, and the stream processor status information comprises at least one of first status information of the processor core and second status information of each of the at least one internal memory, and wherein the selecting comprises assigning a priority to each of the stream processors by comparing the second status information of each of the plurality of stream processors, and then comparing the first status information of each of the plurality of stream processors, and selecting the single stream processor based on the assigned priority.

16. The method of claim 15, wherein the selecting of the stream processor comprises assigning a priority to a steam processor of which the second status information corresponds to standby status information that is higher than a priority of a stream processor of which the second status information corresponds to read/write status information, assigning a priority to a stream processor of which the first status information corresponds to idle status information that is higher than a priority of a stream processor of which the first status information corresponds to busy status information, and selecting the single stream processor based on the assigned priority.

17. The method of claim 16, wherein:

each of the stream processors includes two internal memories, and the assigning of the priority comprises selecting stream processor status information where first status information of the processor core includes idle status information and second status information of all the two internal memories includes standby status information, and assigning a first priority to at least one stream processor corresponding to the selected stream processor status information.

18. The method of claim 16, wherein:

each of the stream processors includes two internal memories, and the assigning of the priority comprises selecting stream processor status information where first status information of the processor core includes busy status information and second status information of any one of the two internal memories includes standby status information, and assigning a second priority to at least one stream processor corresponding to the selected stream processor status information.

19. The method of claim 16, wherein:

each of the stream processors includes two internal memories, and the assigning of the priority comprises selecting stream processor status information where first status information of the processor core includes idle status information and second status information of any one of the two internal memories includes standby status information, and assigning a third priority to at least one stream processor corresponding to the selected stream processor status information.

20. The method of claim 16, wherein:

each of the stream processors includes two internal memories, and the assigning of the priority comprises selecting stream processor status information where first status information of the processor core includes busy status information and second status information of all the two internal memories includes read/write status information, and assigning a fourth priority to at least one stream processor corresponding to the selected stream processor status information.

* * * * *